April 11, 1967

J. ROSING ET AL 3,313,382

LUGGAGE CASE

Filed May 3, 1965

INVENTORS.
JOHN ROSING
WILLIAM R. KING
BY OSCAR C. HEWETT

Van Valkenburgh & Lowe
ATTORNEYS

April 11, 1967  J. ROSING ET AL  3,313,382
LUGGAGE CASE

Filed May 3, 1965  3 Sheets-Sheet 2

INVENTORS.
JOHN ROSING
WILLIAM R. KING
BY OSCAR C. HEWETT

Van Valkenburgh & Lowe
ATTORNEYS

United States Patent Office 3,313,382
Patented Apr. 11, 1967

3,313,382
LUGGAGE CASE
John Rosing, Littleton, and William R. King and Oscar C. Hewett, Denver, Colo., assignors to Samsonite Corporation, Denver, Colo., a corporation of Colorado
Filed May 3, 1965, Ser. No. 452,674
7 Claims. (Cl. 190—49)

This invention relates to luggage cases, and more particularly to so-called "soft-sided" luggage cases.

With the advent of air line travel, the weight of luggage has become quite important, since the transportation of an air passenger's luggage, in excess of a nominal weight, is very costly. Thus, a heavy luggage case adds to the probability of the passenger paying dearly for excess weight. A luggage case formed of wood layers adhered together and covered with a layer of plastic or the like, is unduly heavy for air travel. Also, a luggage case having a central frame and concave shells, as of metal covered with plastic or molded from resin and a filler, can be extremely durable if properly made, but is usually heavier than a so-called "soft-sided" luggage case, which usually comprises merely fabric stretched over a framework, such as formed of metal tubing. Such a soft-sided luggage case can be light in weight but previous frames are often broken or forced out of shape by other pieces of luggage being piled on top, through dropping when full or through similar rough usage. Also, impact on the side wall of such a luggage case may result in tearing or other damage to the covering, such as fabric or other suitable material, which is merely stretched over the frame, or also to damage articles contained in the luggage case. Soft-sided luggage cases having an outer covering of leather, particularly relatively pliable and soft leather, have a luxurious appearance but lack resistance to scuffing and marring.

Among the objects of this invention are to provide a novel soft-sided luggage case; to provide such a luggage case which is light in weight but durable in use; to provide such a luggage case having side walls which will yield slightly to impact but will readily spring back into shape; to provide such a luggage case having side walls which will reduce effectively the transmission of impacts through the side walls to articles packed in the luggage case; to provide such a luggage case in which the side walls are adequately supported by a central frame; to provide such a luggage case having side walls formed of an outer layer including resin or the like which may have not only the appearance but also an approximation of the feel of soft leather; to provide such a luggage case having a strong but resilient, self-supporting joint between each side wall and the remainder of the case section; to provide such a luggage case which resiliently resists forces or impacts on areas adjacent the side walls; and to provide such a luggage case which is economical to manufacture.

Additional objects and the novel features of this invention will become apparent from the description which follows, taken in conjunction with the accompanying drawings, in which.

Figure 3:
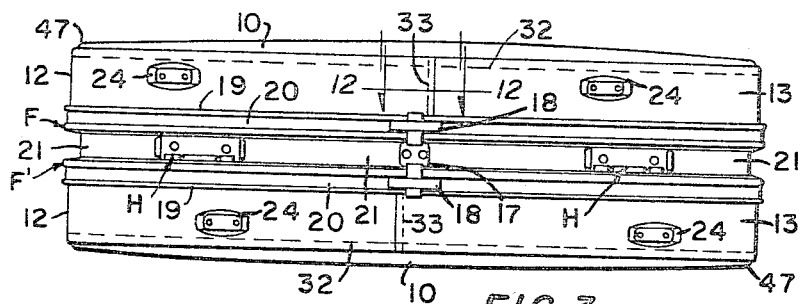
FIG. 3 is a bottom plan view of the luggage case of FIG. 1.
Figure 5:
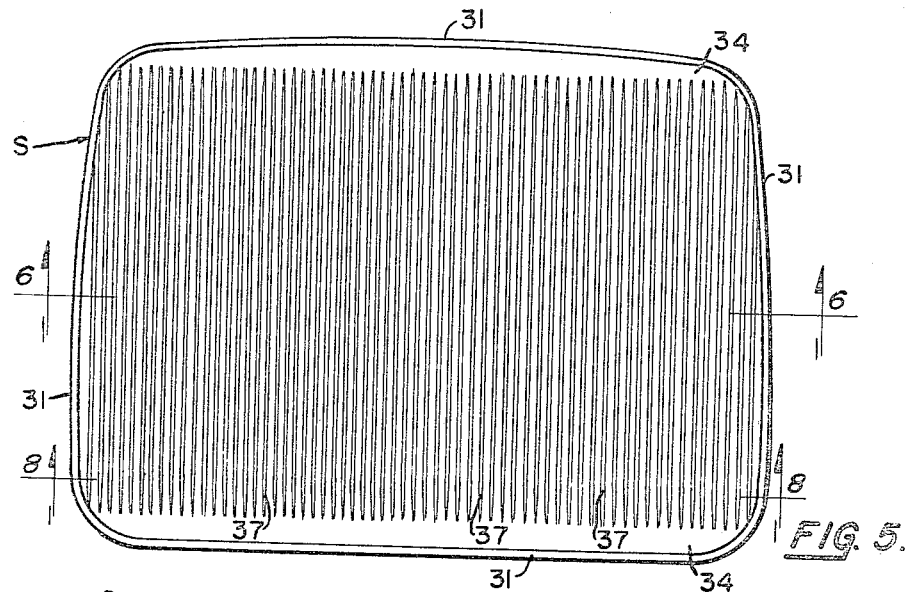
FIG. 5 is an elevation, taken from the inside of a corrugated or ribbed, molded or formed plastic shell which forms the principal supporting member for each of the side walls of the luggage case.
Figure 9:
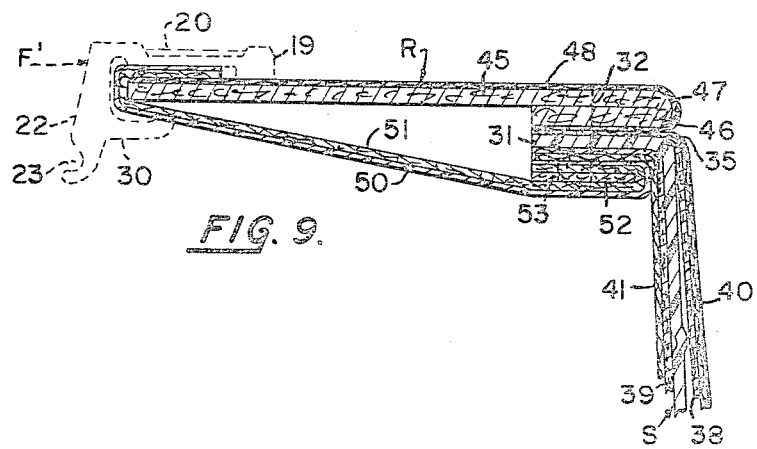
FIG. 9 is a fragmentary horizontal section, on an enlarged scale and taken along line 9—9 of FIG. 4, showing particularly details at one corner, as assembled prior to attachment to a frame strip, shown in dotted lines.
Figure 11:
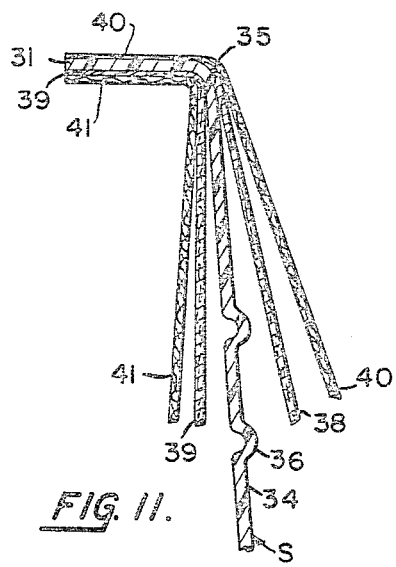
Figure 12:
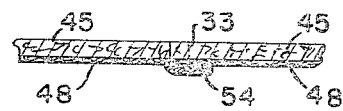

FIG. 11 is an enlarged, fragmentary, transverse section of the upper edge of a composite side wall which includes the shell of FIG. 5 and is also incorporated in the corner shown in FIG. 9, with the various layers thereof separated for clarity of illustration; and FIG. 12 is an enlarged, fragmentary, transverse section of a portion of the bottom of the luggage case, taken along line 12—12 of FIG. 3.

Figure 1:
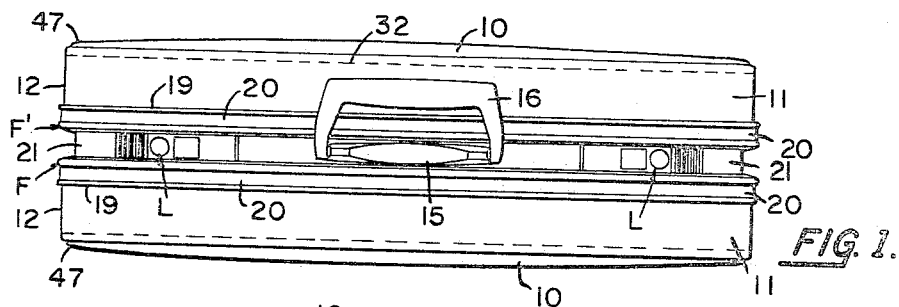
FIG. 1 is a top plan view of a soft-sided luggage case constructed in accordance with this invention.
Figure 2:
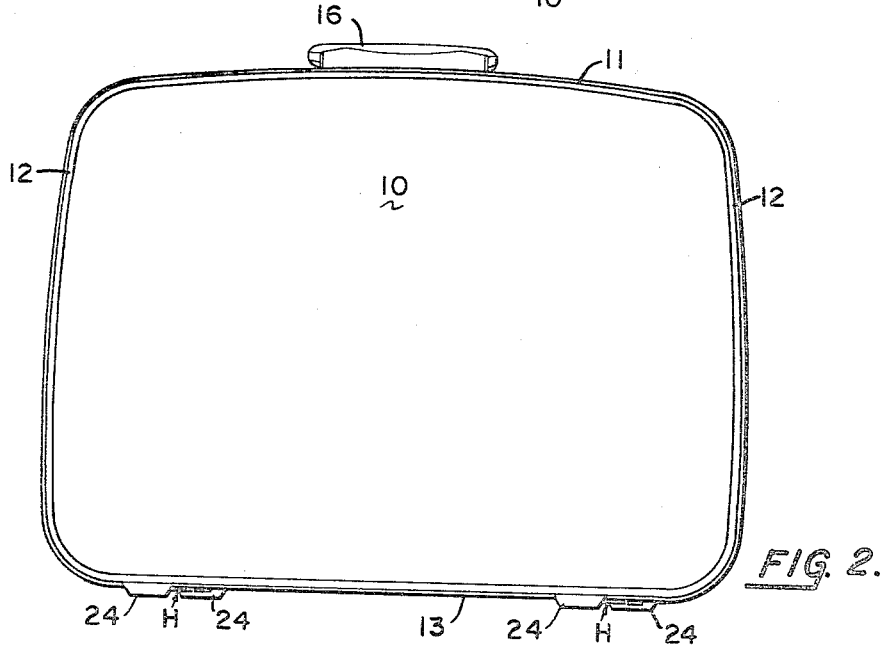
FIG. 2 is a side elevation of the luggage case of FIG. 1.
Figure 4:
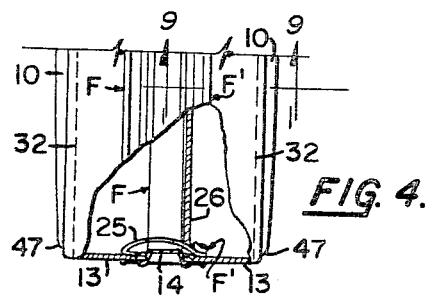
FIG. 4 is a fragmentary end elevation of the lower portion of the luggage case of FIG. 1, partly broken away to show interior parts.

A soft-sided luggage case of this invention includes two opposed, concave sections which are respectively provided with relatively rigid frame strips F and F', adapted to interfit when the case is closed, as in FIGS. 1 and 4, to form a seal between the sections. Each section of the case has a side wall 10, a top wall 11, end walls 12 and a bottom wall 13, while the frame strip F is provided with a tongue 14, as in FIG. 4, which forms the bottom of a recess which extends longitudinally around the luggage case and in which locks or latches L are installed at the top, as well as a handle support 15 for a handle 16. The case sections are pivotally attached together at the bottom by hinges H, which are attached to the frame strips F and F', which may be extruded from a light metal, such as aluminum or magnesium alloy, or may be made of any other suitable material. Such strips are cut to length, bent to shape and the ends attached together at the bottom, with the joint being covered by clips 17 and 18. The frame strips F and F', as shown, are constructed as disclosed in the Willard G. Axtell U.S. Patent 2,950,793, thus being provided with a lateral outside flange 19 having a groove in which a non-metallic strip 20, as of plastic, is secured, as by adhesive, while non-metallic strips 21 are also conveniently secured, as by adhesive, to the tongue 14, between hinges H at the bottom and between the hinges H and the respective latch L, around each end of the case. The frame strip F', as in FIG. 9, may be provided with an inner flange 22 and a groove 23 for receiving the edge of tongue 14 of frame strip F. The latches L and L', as shown, are constructed as disclosed in the Lee F. Garmon et al. U.S. Patent 3,034,327, although any other suitable latch construction may be utilized. Similarly, the frame strips F and F' may be varied in construction, as by substituting a series of closely spaced, longitudinal grooves or ribs for the non-metallic strips 20, or by placing the lateral flange 19 on the inside and leaving only a bead or narrow flange on the outside. Or, the frame strip F may be provided with a U-shaped flange along the edge of tongue 14 which, on one side, forms one wall of the recess and, on the other side, receives the frame strip F'. Also, the frame strips F and F' may be formed as disclosed in the Emmett H. Heitler U.S. Patent 2,861,661, with appropriate changes for clamping or attaching the remainder of the corresponding section thereto. When the case is in the upright position of FIG. 2, it may rest on feet or glides 24, which are mounted on the bottom of the respective case sections. On the inside of the case, at the bottom, an apron 25 may extend between the case sections and across the frame strips, to prevent small articles from falling through the slot exposed when the case is opened, or to prevent other articles from being caught in the slot, while a pivotal partition 26 may be installed at the inner edge of either or both case sections.

Figure 10:
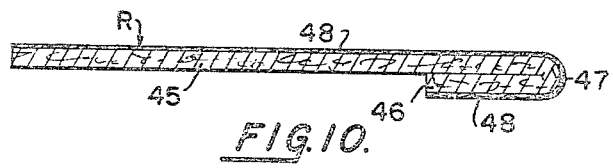
FIG. 10 is an enlarged transverse section of a composite strip which forms the top, bottom and end walls, along with the corresponding frame strip, and is also incorporated in the corner shown in FIG. 9.

In accordance with this invention, each side wall 10 is formed by a multiply construction, the principal supporting member of which is a shell S of FIG. 5, molded or otherwise suitably formed from a relatively stiff but resilient plastic, such as medium density polypropylene, while the top, bottom and end walls of each section are formed by a multiply rail R of FIG. 10, along with the respective frame strips F and F'. The inner edge of rail R extends beneath the lateral outside flange 19 of the frame strip, as in FIG. 9, and is attached thereto by an inside flange 30, which is crimped or rolled thereon during assembly, as described later. The side wall construction, including shell S, is attached to the outer edge of rail R by a strong but resilient, self-supporting joint, such as including a flange 31 of shell S and stitching 32 extending around the case, also as described later, while the ends of rail R may be attached together by transverse stitching 33, preferably at the bottom, as in FIG. 3. If desired, the abutting ends of rail R may be attached to and covered by a plate or clip, similar in function to clips 17 and 18.

Figure 6:
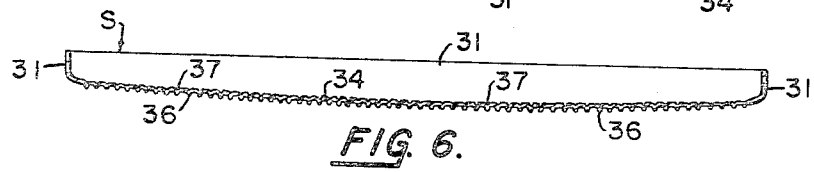
FIG. 6 is a longitudinal section taken along line 6—6 of FIG. 5.
Figure 7:
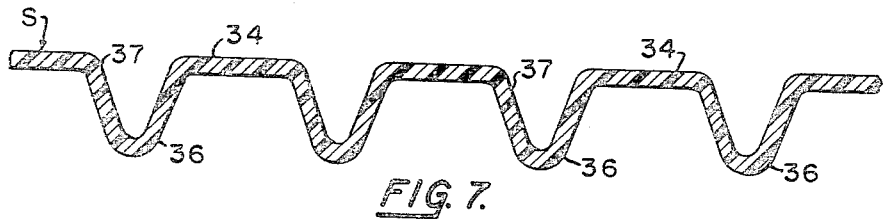
FIG. 7 is a fragmentary longitudinal section, corresponding to a portion adjacent the center of FIG. 6, on an enlarged scale.
Figure 8:
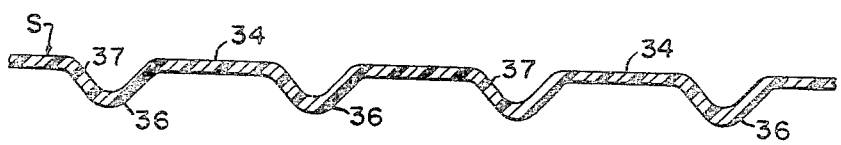
FIG. 8 is a similar fragmentary longitudinal section, but taken along line 8—8 of FIG. 5.

Shell S, as in FIGS. 5, 6, 7 and 8, is provided around the periphery of wall 34 with the short, inwardly extending flange 31 and wall 34 is formed so as to bow outwardly from each edge toward the center, as in FIG. 6, similar to the contour of side walls 10, as shown in FIGS. 1, 3 and 4. As in FIG. 11, the connection or bend 35 between flange 31 and wall 34 should be curved or arcuate, rather than a right angle bend, to provide maximum resistance to stress, particularly at the rounded corners. In further accordance with this invention, shell S is provided with a series of ribs or corrugations, shown as extending vertically but adapted to extend in any other direction, to form a series of ridges 36 on the outside and a corresponding series of grooves 37 on the inside, with the ridges and grooves being deeper adjacent the center, as in FIGS. 6 and 7, and shallower towards the upper and lower edges, as in FIG. 8, to merge with the shell adjacent the upper and lower edges thereof, as in FIG. 5. Also, the ridges and grooves also preferably are shallower toward each end of the shell, as in FIGS. 6 and 11, while ridges 36 are preferably curved on the outer edges, rather than pointed, for a purpose described later. It will be noted that, in FIG. 5, the view is taken toward the grooves on the inside, but a corresponding configuration of ridges will appear on the outside. In FIGS. 7 and 8, the inside of wall 34 is shown as flat, except for grooves 37, but the ridges 36 may extend inwardly from approximate center of the shell wall, so that the inwardly and outwardly extending ridges will be interspaced with each other. In the latter instance, a cross section of the shell wall, corresponding to FIG. 6, may be similar in appearance to a sine wave. The ribs may, of course, have any shape or configuration which will retain the desired shape when at rest, such as outwardly bowed, but will resist deformation to a considerable extent and will particularly spring back to its initial shape after deformation.

The shell S may be formed by injection molding, but more conveniently by forming a heated sheet of the material which is drawn by vacuum or forced by pressure against a die having a configuration corresponding to that ultimately desired, or between a pair of complementary dies. As indicated previously, shell S may be formed of a medium density polypropylene, but it will be evident that other materials may be used, such as polyethylene, ABS or acrylonitrile butadiene styrene copolymer, high impact styrene, polyolomer vinyl, flexible thermosetting resin with fiber reinforcement, flexible impregnated felt, or others, particularly those which have a high resistance to puncture, return to shape after deformation and adequate stress resistance.

The side wall construction, as in FIGS. 9 and 11, includes a layer of padding 38 on the outside of the shell and a similar padding layer 39 on the inside of the shell. Padding 38 and 39 may be a non-woven acetate or an expanded polyurethane or polyester, although any other material which will provide a cushioning effect will be suitable. The outer padding layer 38 is drawn against the shell, primarily contacting the ridges 36 and stretching over them, by an outer covering 40, with the rounded outer edges of the ridges 36, referred to previously, holding the padding 38 and outer covering 40 out to the desired position to provide a crown appearance, but without shearing or otherwise damaging the same, as would be the tendency of pointed or sharp edges on the ribs. For certain cases, such as the train or beauty case type, ridges 36 may be omitted. Covering 40 may be woven cloth, preferably impregnated with a marr and scuff resistant resin, such as polyvinyl chloride. Or covering 40 may be formed from a plastic sheet of polyvinyl chloride or vinyl copolymer having a pattern embossed on the outside thereof, such as to simulate the appearance of leather, although any other desired pattern may be utilized. A cloth layer may, if desired, be laminated to the inside of the plastic sheet. When the embossed pattern simulates the appearance of leather, the similarity to leather is further enhanced by the feel of the side wall cover, due to the resilient backing of padding 38. A lining 41 is installed inside inner padding 39, and may be laminated to the padding by an adhesive, prior to installation. Outer padding 38 and covering 40 are stretched over the outside of the shell and covering 40 is secured by adhesive to the outside of shell flange 35, since outer padding terminates at the bend 35 adjacent flange 31, to permit covering 40 to be secured by adhesive directly to flange 35, since covering 40 is pulled taut against the shell and padding. Inner padding 39 and lining 41 may be secured by adhesive, to the inside of shell S, at spaced points, and also secured, by adhesive, to the inside of shell flange 31.

The multiply rail R, as in FIG. 10, includes a strip 45, also of relatively stiff but resilient material, which preferably can be bent double without cracking and which will spring back to its original shape after deformation. Strip 45 is conveniently formed of "Pellon 1246L, which is a compressed, non-woven batting of mixed fibers and a latex binder, manufactured by Pellon Corporation of New York, N.Y., although other materials having suitable properties, such as polypropylene, impregnated felt, "hard" felt, or laminated paperboard with a suitable binder, may be utilized. Rail R also includes a strip 46, attached to the underside of the outer end of strip 45 and corresponding in width to flange 31 of shell S. Strip 46 may be integral with strip 45, the latter thus initially having a width corresponding to the combined width of both strips, but scored on the underside and bent around, to provide a rounded edge 47, as in FIGS. 1, 3, 9 and 10. A covering 48, formed of material similar to or the same as covering 40, may be laminated to strip 45, including integral strip 46, prior to bending the latter under the outer end of the former. In the event strip 45 is a separate strip, prior to installation, strip 46 is secured to the underside of strip 45, at the outer end, by an adhesive and covering 48 stretched around them, being secured by adhesive to the inner end of strip 45, on the top, and to strip 46, on the bottom. As in FIG. 9, a lining 50, as of cloth, is laminated to a padding layer 51, as by adhesive. The laminated lining is stretched around an inner strip 52, corresponding in width to but thinner than strip 46 and conveniently formed of any suitably stiff material, then attached thereto, at the top, as by stitching 53, level the lower portion free.

For assembly of rail R to the side wall, the parts are placed together as in FIG. 9, with the outer end of rail R placed against cover 40 on the outside of flange 31 and the inner strip 52 placed against lining 41 on the inside of flange 31. Then, the stitching 32 is applied, extending through the layers comprising covering 48, strips 45 and 46, covering 48 again, covering 40, shell flange 31, linings 41 and 50, padding 51 and inner strip 52. The joint so produced has numerous advantages, as will be pointed out below. The ends of rail R may then be attached together, as by stitching 33 of FIG. 3. For such attachment, one end of covering 48 may extend beyond the corresponding end of strip 45 and folded under in a flap 54 of FIG. 12, for stitching to the opposite, abutting end of strip 45, as by stitching 33. Or, as indicated previously, the ends may be abutted and covered by a plate or clip. If desired, the abutting ends may be covered by a piece of cloth or vinyl similar to covering 48, which is then stitched to both ends of rail R. After rail R is attached to the side wall, including shell S, a thin tape of cellulose provided with adhesive on both sides (not shown) may be placed around the inner edge of rail R, on the outside, then the inner edge of laminated lining 50 is passed around the inner edge of strip 45 and attached to the adhesive tape, the width of lining 50 being such that lining 50 is pulled across the space but not completely taut. Or, the end of the laminated lining may be stretched across to and around the inner end of rail R, then stitched thereto or secured thereto by adhesive. The feet or glides 24 may be attached to rail R, after attachment to the frame F or F' but preferably prior to attachment of laminated lining 50 to the inner end of rail R, so that the lining will cover the rivets or other suitable fastening devices by which the glides are attached to rail R. The glides may be attached in the position shown in FIG. 3, so that the flexibility of rail R will permit the glides to adjust to an uneven surface on which the luggage case may be placed.

When inside flange 30 of frame F', or the corresponding flange of frame F, is clamped or rolled against the inner end of rail R, the inner end of the rail will be held securely; also, laminated lining 50 will be tightened. As will be evident, the various parts of the components used in the assembly have been previously attached together, so that the stitching 32 is readily applied. Also, both covering 40 and covering 48, as well as lining 41 and 50, extend into the joint, while covering 48 and lining 50 also extend within the frame, so that no edge of a covering, lining or padding is exposed. Due to the fact that flange 31 of shell S is integral therewith and extends completely around the shell, as well as the fact that it is connected to the shell wall by the curved bend 35 which, at each rounded corner, is curved three dimensionally, a strong but resilient, self-supporting joint is provided. Thus, the outer edges of the top, bottom and end walls are adequately supported, thus avoiding the necessity for providing a metal or wooden frame inside these edges, as in the more usual soft-sided luggage case constructions. Also, the joint between rail R and the side wall cooperates with the rigid frames F and F' which, when connected together, add rigidity and resistance to deformation to the construction, to support the top, bottom and end walls therebetween.

The shell S also contributes other advantages, particularly when combined with the outer padding layer between the shell and the covering. For instance, the ribs in the shell resist deformation of each side wall to a high degree. Also, if a force of sufficient magnitude is exerted or a corresponding blow struck against the side wall, as in the central portion, the shell will be pushed inwardly, but the force or blow will tend to flatten the ribs struck directly and the shell will recover to cause the side wall to assume its normal shape after the force is removed. If the blow is against a small, localized area, as against one rib or two or more adjacent ribs, the covering will be pushed against the padding 38, which absorbs some of the energy of the blow, while the ribs will absorb the remainder of the energy of the blow, unless sufficient to push the side wall in, when other ribs will absorb additional energy of the blow. In the event the blow is in a sufficiently small area and in a position between two ribs, the cover will be pushed inwardly and against the padding, which again absorbs some of the energy of the blow, until the padding is compressed against the shell between the ribs, then the adjacent ribs will be bent toward the area to provide additional resistance. In addition to the resistance to and absorption of the energy of a force or blow provided by the shell ribs, as well as the outside padding, the inside padding provides additional protection for articles within the luggage case, since it must be compressed against the inside of the shell before a blow can exert force against an article in the case.

As will be evident, other variations in construction may be utilized. For instance, an extruded strip, as of plastic, having a rounded bead on the outside, such as quadrispherical or generally hemispherical on the outside, may be substituted for strip 46, with the bead supplying the rounded offset edge 47 in the top, bottom and end walls of FIGS. 1, 3 and 8. Such a bead may be placed inside covering 48, or may be visible on the outside. In lieu of stitching 32, the joint between the flange 31 of shell S and associated parts may be produced by heat welding, with an appropriate choice of materials, or by utilizing an appropriate glue or adhesive.

From the foregoing, it will be evident that the objects and requirements hereinbefore specified have been fulfilled to a marked degree. Although a preferred construction has been illustrated and described, it will be evident that other embodiments may exist and that changes and variations may be made, in addition to those specifically enumerated, without departing from the spirit and scope of the invention.

What is claimed is:

1. A luggage case comprising a pair of opposed concave sections, at least one of said sections having:
   a frame extending around the inner edge thereof;
   a side wall spaced from said frame and including a shell formed of relatively stiff but flexible material, having an outer side and an inwardly extending flange connected to said outer side by a curved portion of said shell;
   top, bottom and end walls extending between and attached to said frame and the outside of said shell flange, said top, bottom and end walls including a rail strip of relatively stiff but resilient material attached to said shell flange on the outside thereof and to said frame;
   a covering overlying said strip and extending beneath said frame and around the end of said strip and between said strip and said shell flange; and
   said side wall includes a covering outside said shell and extending between said strip and said shell flange.

2. A luggage case as defined in claim 1, including:
   an inner strip attached to the inside of said shell flange and corresponding in width thereto;
   a side wall lining extending across the inside of said shell and between said inner strip and said shell flange; and
   a top, bottom and end wall lining extending from between said inner strip and said shell flange, around said inner strip on the inside thereof and to the inner edge of said rail strip.

3. A luggage case comprising a pair of opposed concave sections, at least one of said sections having:
   a frame extending around the inner edge thereof;
   a side wall spaced from said frame and including a shell formed of relatively stiff but flexible material having a series of ribs therein and an inwardly extending, peripheral flange;

top, bottom and end walls extending between and attached to the periphery of said side wall and said frame, said top, bottom and end walls including a rail strip of relatively stiff but resilient material and a covering layer on the outside thereof;

a second strip of relatively stiff but resilient material disposed on the outside of said flange;

a third strip of relatively stiff but resilient material disposed on the inside of said flange, said second and third strips corresponding in width to said flange;

an outer covering for said side wall extending between said shell flange and said second strip;

said outer covering of said top, bottom and end walls extending around said second strip and between said second strip and said shell flange;

a lining extending around said third strip, from between said third strip and said flange, to the inner end of said rail strip; and said first, second and third strips and said shell flange are attached together by stitching.

4. A luggage case comprising a pair of opposed concave sections having top, bottom, end and side walls, each of said sections having a rigid frame extending around the inner edge thereof and adapted to interfit with the opposite frame when the case is closed, each said frame having a lateral outside flange and an inside flange spaced from said outside flange;

a side wall spaced from the corresponding frame and including a formed shell of relatively stiff but flexible material having a series of ribs therein, said shell having an integral peripheral flange extending inwardly in the direction of said frame and the side of said shell being bowed outwardly toward the center, said ribs extending generally in a direction transverse to said top and bottom walls and at least on the outside of said shell, said ribs being deeper in the central area of said shell and shallower toward and adjacent said flange;

said side wall further including a layer of compressible padding outside said shell and an outer covering holding said padding against said shell and a layer of compressible padding inside said shell and a lining on the inside of said padding, said outer covering being adhesively secured to the outside of said flange and said outer padding terminating short of said flange;

said top, bottom and end walls including a strip of relatively stiff but resilient material and a covering layer on the outside thereof, each extending from said side wall to said frame and clamped between said outside and inside flanges of said frame; and a resilient, substantially self-supporting joint connecting said side wall and said top, bottom and end walls, said joint including said shell flange, a second strip of relatively stiff but resilient material disposed on the outside of said flange, a third strip of relatively stiff but resilient material disposed on the inside of said flange, said second and third strips corresponding in width to said flange, with said outer covering of said side wall extending into said joint, between said flange and said second strip, and said outer covering of said top, bottom and end walls extending around said second strip and into said joint between said second strip and said flange, a layer of lining extending around said third strip, from between said third strip and said flange to the inner end of said first strip and clamped by said inside flange of said frame, said first, second and third strips and said flange being attached together by stitching.

5. A luggage case comprising a pair of opposed concave sections, at least one of said sections having:

a frame extending around the inner edge thereof;

a side wall spaced from said frame and including a shell formed of relatively stiff but flexible material having a series of ribs therein, a layer of compressible padding outside said shell and an outer covering holding said padding against said shell ribs; and top, bottom and end walls extending between and attached to the periphery of said side wall and said frame, said top, bottom and end walls including a rail strip of relatively stiff but resilient material.

6. A luggage case comprising a pair of opposed concave sections, at least one of said sections having:

a frame extending around the inner edge thereof;

a side wall spaced from said frame and including a shell formed of relatively stiff but flexible material having a series of ribs therein;

said side wall including a layer of compressible padding outside said shell and an outer covering holding said padding against said shell ribs; and top, bottom and end walls extending between and attached to the periphery of said side wall and said frame.

7. A luggage case comprising a pair of opposed concave sections, at least one of said sections having:

a frame extending around the inner edge thereof;

a side wall spaced from said frame and including a shell formed of relatively stiff but flexible material having a series of ribs therein and an inwardly extending, peripheral flange;

said side wall including a layer of compressible padding outside said shell and an outer covering holding said padding against said shell ribs, said outer covering being adhesively secured to the outside of said flange and said outer padding terminating short of said flange; and top, bottom and end walls extending between and attached to the periphery of said side wall and said frame.

References Cited by the Examiner

UNITED STATES PATENTS

| 3,098,548 | 7/1963 | Bialo | 190—49 |
| 3,136,398 | 6/1964 | Platt | 190—49 X |

FOREIGN PATENTS

| 859,995 | 1/1961 | Great Britain. |
| 868,686 | 5/1961 | Great Britain. |

JOSEPH R. LECLAIR, *Primary Examiner.*

FRANKLIN T. GARRETT, GEORGE O. RALSTON,
*Examiners.*

D. F. NORTON, *Assistant Examiner.*